3,029,271
ORGANIC PHOSPHORUS COMPOUNDS
Gail H. Birum, Dayton, Ohio, and James L. Dever, Arlington, Mass., assignors to Monsanto Chemical Company, St. Louis, Mo., a corporation of Delaware
No Drawing. Filed Nov. 4, 1960, Ser. No. 67,174
19 Claims. (Cl. 260—461)

The present invention relates to organic compounds of phosphorus and more particularly provides certain new phosphites containing phosphinyl or cyano radicals and the method for preparing them.

According to this invention, there are provided compounds having the general formula

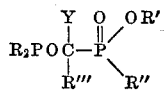

wherein R is selected from the group consisting of alkyloxy, cycloalkyloxy, and haloalkyloxy and halogen-substituted cycloalkyloxy radicals having from 1 to 12 carbon atoms, and wherein two R radicals taken together denote an -O-hydrocarbylene-O-radical which completes a ring with the phosphorus atom and has from 2 to 4 carbon atoms in the ring and a total of from 2 to 12 carbon atoms, R' is selected from the group consisting of alkyl and haloalkyl radicals having from 1 to 12 carbon atoms, R'' is selected from the group consisting of OR' and hydrocarbyl radicals which are free from aliphatic unsaturation and have from 1 to 12 carbon atoms, R''' is selected from the group consisting of alkyl radicals having from 1 to 12 carbon atoms and aryl radicals having from 6 to 12 carbon atoms, and Y is selected from the group consisting of the cyano group (—CN) and a phosphinyl radical having the formula

wherein R, R', R'', R''' and Y are as defined above. For

The term "hydrocarbyl," as used in this case, is defined in Degering, An Outline of Organic Chemistry, 5th edition (1947), page 135, as follows: "Hydrocarbyl is the radical obtained by the loss of a hydrogen atom from any hydrocarbon."

The term "-hydrocarbylene-" denotes a bivalent hydrocarbon radical obtained by the loss of two hydrogen atoms from the hydrocarbon, and is consistent with the familiar chemical terminology "alkylene" and "arylene" which denote the bivalent state of alkanes and arene compounds, respectively.

Specific examples of compounds within the above general formula are:

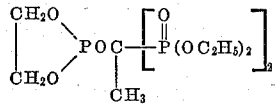

which is 2-[1,1-bis(diethoxyphosphinyl)ethoxy]-1,3,2-dioxaphospholane;

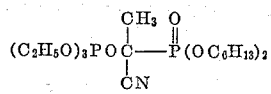

which is 1-(dihexyloxyphosphinyl)-1-cyanoethyl diethyl phosphite; and

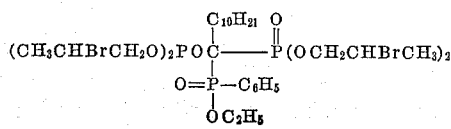

which is 1-[bis(2-bromopropoxy)phosphinyl]-1-(ethoxyphenylphosphinyl)undecyl bis(2-bromopropyl)phosphite.

According to the method of this invention, compounds of the above described type are prepared by reacting a phosphoromonochloridite with an acylphosphonate or -phosphinate or an acyl cyanide and a trivalent phosphorus ester according to the following general equation:

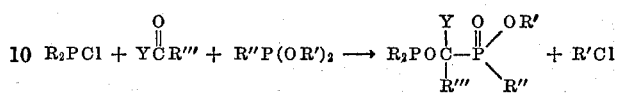

wherein R, R', R'', R''' and Y are defined above. For example, by reacting bis(3-chlorohexyl) phosphorochloridite with diethyl butyrylphosphonate and tri(4-chlorohexyl) phosphite, there is produced 1-(diethoxyphosphinyl) - 1 - [bis(4 - chlorohexyloxy)phosphinyl]butyl bis(3-chlorohexyl) phosphite. Also, when 2-chloro-4-methyl-1,3,2-dioxaphospholane is reacted with acetyl cyanide and trimethyl phosphite there is obtained as the main product 2-[1-(dimethoxyphosphinyl) - 1 - cyanoethoxy]-4-methyl-1,3,2-dioxaphospholane. Similarly, if dodecyl 2-chloroethyl phosphorochloridite is reacted with 2-bromobutyl phenylnaphthoylphosphinate and dipropyl benzylphosphonate, there is prepared α-[(2-bromobutoxy)phenylphosphinyl]-α-[(propoxy)benzylphosphinyl]naphthyl dodecyl 2-chloroethyl phosphite.

Examples of trivalent phosphoromonochloridites that may be used for preparing the compounds of this invention are the alkyl, cycloalkyl, haloalkyl, and halogen-substituted cycloalkyl phosphoromonochloridites. Dialkyl phosphoromonochloridites include dimethyl, diethyl, dipropyl, diisopropyl, dibutyl, dihexyl, diheptyl, dioctyl, didecyl, didodecyl, di(2-ethylhexyl) phosphoromonochloridites and those wherein the ester radicals are derived from branched chain alcohols such as propylene tetramer and butylene trimer, for example by the Oxo process, and those wherein the alkyl radicals are of different types, that is mixed alkyl radicals, for example, ethyl hexyl phosphoromonochloridite and butyl dodecyl phosphoromonochloridite.

Examples of haloalkyl phosphoromonochloridites that may be used are, for example, bis(2-chloroethyl), bis(4-bromohexyl), bis(3-bromopropyl), bis(2-iodobutyl), bis-(10,11-dichlorododecyl), and bis(8-fluorodecyl)phosphoromonochloridite, as well as mixed haloalkyl phosphoromonochloridites such as 2-chloroethyl 2-chloropropyl phosphoromonochloridite and 4-bromohexyl 3-chlorooctyl phosphoromonochloridite, and mixed alkyl haloalkyl phosphoromonochloridites such as butyl 4-chlorobutyl phosphoromonochloridite and 2-chloropropyl hexyl phosphoromonochloridite.

Examples of cycloalkyl and halocycloalkyl phosphoromonochloridites are, e.g., dicyclohexyl, dicyclopentyl, ethyl cyclobutyl, propyl 3-chlorocyclopentyl, bis(4-bromocyclohexyl), 2-chlorobutyl cycloheptyl phosphorochloridites.

An especially useful class of phosphorochloridite reactants are the cyclic phosphorochloridites, that is, those defined by two R radicals taken together to denote bivalent -O-hydrocarbylene-O- cyclic phosphorus esters. A few examples of such compounds are: 2-chloro-1,3,2-dioxaphospholane, 2-chloro-4-methyl-1,3,2-dioxaphospholane, 2-chloro-4,5-diethyl-1,3,2-dioxaphosphorinane, 2-chloro-5-methyl-5-hexyl-1,3,2-dioxaphosphorinane, 2-chloro-4,5-benzo-1,3,2-dioxaphospholane, 2-chloro-4,5-(4-methyl) benzo - 1,3,2 - dioxaphospholane and 2-chloro-5-methyl-1,3,2-dioxaphosphepane.

Acylphosphonate compounds that may be used to prepare the compounds of this invention are for example, dimethyl acetylphosphonate, diethyl propionylphosphonate, dinonyl hexanoylphosphonate, propyl hexyl dodecanoylphosphonate, butyl 2-chloroethyl benzoylphosphonate, 2 - bromopropyl phenyl 4 - methylbenzoylphosphonate, bis(4-fluoroheptyl) naphthoylphosphonate, bis(2-chloropropyl) p-cumenoylphosphonate, 2-chloroethyl naphthyl benzoylphosphonate, etc.

Examples of acylphosphinate compounds that may be used are: methyl (phenyl)acetylphosphinate, hexyl (benzyl) - propionylphosphinate, undecyl (p-cumyl) octanoylphosphinate, 2-chloroethyl (m-xylyl)benzoylphosphinate, 4-bromohexyl (cyclohexyl)dodecanoylphosphinate, 2-chloropropyl (o-tolyl)-propanoylphosphinate.

Acyl cyanide compounds that may be used are, for example, acetyl, propionyl, butanoyl, hexanoyl, nonanoyl, dodecanoyl, 2-ethylhexanoyl, benzoyl, 4-methylbenzoyl, naphthoyl, and 2,4-dimethylbenzoyl cyanides.

Trivalent phosphorus esters which are generally useful with the phosphorochloridities and acyl compounds described above are either simple or mixed phosphites, and phosphonites, preferably having two or three alkoxy or haloalkoxy radicals of from 1 to 12 carbon atoms bonded to the phosphorus atom. Examples of useful phosphite compounds are trimethyl, triethyl, triisopropyl, tri-n-propyl, tri-n-butyl, tri-tert-amyl, tri-n-hexyl, tri-n-heptyl, tris(2-ethylhexyl), tri-n-octyl, trinonyl, tridecyl, triundecyl, tri-tert-dodecyl, amyl diethyl, butyl di-n-propyl, dodecyl dimethyl, ethyl octyl propyl, tris(2-chloroethyl), tris(3-chloropropyl), tris(2-chlorobutyl), tris(3,4-dichlorobutyl), tris(2-bromoethyl), tris(2-fluorobutyl), tris(dichlorododecyl), 2-chloroethyl diethyl, 3-bromopropyl bis(2-chloroethyl), diamyl trichlorooctyl, 2-chloroethyl 3-chloropropyl 4-chlorobutyl, 2-chloroethyl methyl propyl, tris(2,3-dichloropropyl), dimethyl phenyl, diethyl p-tolyl, and bis(2-chloroethyl) naphthyl phosphites. Examples of phosphonite compounds are dimethyl methylphosphonite, dipropyl phenylphosphonite, diethyl amylphosphonite, ethyl octyl propylphosphonite, diethyl naphthylphosphonite, dinonyl nonylphosphonite, 2-chloroethyl butyl propylphosphonite, dibutyl phenylphosphonite, and diethyl benzylphosphonite. Mixtures of phosphite and phosphonite esters may also be used.

A particular embodiment of this invention involves the simultaneous preparation of the phosphoromonochloridite and trivalent phosphorus triester used in the method of this invention by reacting phosphorus trichloride with a sufficient molar amount of an oxirane compound or a glycidyl ether compound to produce a product having a phosphoromonochloridite to trivalent phosphorus ester mole ratio of about 1:1 to about 1:2. Thus, when sufficient oxirane or glycidyl ether compound is used to produce a 1:1 mole ratio of phosphoromonochloridite to phosphite, it is only necessary to then add the acylphosphonate, acylphosphinate, or acyl cyanide reactant to the mixture to prepare compounds within the scope of this invention. When sufficient oxirane or glycidyl ether has been added to produce a mixture having a mole ratio of 1:2, that is, 1 mole of the phosphorochloridite to 2 moles of the trivalent phosphorus ester, the acylphosphonate reactant is prepared in situ by adding to this mixture of phosphorochloridite and excess phosphite ester an acyl chloride or bromide which reacts with its molar equivalent of phosphite ester, producing a mole of the alkyl chloride or bromide by-product. The thus formed acylphosphonate reacts with the phosphorochloridite and phosphite ester to produce the desired compound of this invention. For example, by reacting 2 moles of phosphorus trichloride with 5 moles of propylene oxide, an equimolar mixture of bis(2-chloropropyl) phosphorochloridite and tris(2-chloropropyl) phosphite is obtained. This mixture can then be treated according to the method of this invention, for example, with bis(2-chloroethyl) acetylphosphonate to obtain 1-[bis(2-chloropropoxy) - phosphinyl] - 1 - [bis(2 - chloroethoxy)phosphinyl]ethyl bis(2-chloropropyl) phosphite. Similarly, if 3 moles of phosphorus trichloride is reacted with 8 moles of ethylene oxide there is produced a mixture of 1 mole of bis(2-chloroethyl) phosphorochloridite and 2 moles of tris(2 - chloroethyl) phosphite. When 1 mole of propionyl bromide is added to this mixture, a reaction of 1 mole of the tris(2-chloroethyl) phosphite ester with the propionyl bromide results in the formation of 1 mole of bis(2-chloroethyl) propionylphosphonate which reacts with the bis(2-chloroethyl) phosphorochloridite and the one remaining mole of the tris(2-chloroethyl) phosphite to obtain 1,1-bis[bis-(2-chloroethoxy)phosphinyl]propyl bis(2-chloroethyl) phosphite. Likewise, if hexanoyl cyanide is added to an equimolar mixture of bis(2-chlorobutyl) phosphorochloridite and tris(2-chlorobutyl) phosphite, prepared by reacting phosphorus trichloride and 1,2-epoxybutane in a 2:5 molar ratio respectively, there is obtained as product 1-[bis(2-chlorobutoxy) phosphinyl]-1-cyanohexyl bis(2-chlorobutyl) phosphite.

A few examples of starting materials that may be used and the products obtained therefrom are:

2-chloro-1,3,2-dioxaphospholane, dimethyl acetylphosphonate, and trimethyl phosphite to obtain 2-[1,1-bis (dimethoxyphosphinyl)ethoxy] - 1,3,2 - dioxaphospholane, Bis(3-bromohexyl) phosphorochloridite, bis(2-chloropropyl) propionoylphosphonate, and tris(2-chloroethyl) phosphite to obtain 1-[bis(2-chloropropoxy) phosphinyl] - 1-[bis(2-chloroethoxy)phosphinyl]propyl bis(3-bromohexyl) phosphite, 10,11-dichlorododecyl dodecylphosphonochloridite, ethyl (phenyl)benzoylphosphinate, and diethyl phenylphosphinate to obtain $\alpha,\alpha$-bis(ethoxyphenylphosphinyl) benzyl 10,11-dichlorododecyl dodecylphosphonite, 4-chlorohexyl butylphosphonochloridite, octyl (octyl)-butanoylphosphinate, and bis(2-chloropropyl) amylphosphonite to obtain 1-[(2-chloropropoxy)amylphosphinyl] - 1 - (octyloxy-octylphosphinyl)butyl 4-chlorohexyl butylphosphonite.

Examples of products obtained when a phosphoromonochloridite is reacted with an acylphosphonate and a trivalent phosphorus ester of the types defined above are:

2 - {1 - [bis(2 - chloroethoxy)phosphinyl] - 1 - (diethoxyphosphinyl)ethoxy} - 5,5 - dimethyl - 1,3,2 - dioxaphosphorinane, $\alpha$ - (hexyloxyphenylphosphinyl) - $\alpha$ - [bis(4 - bromooctyloxy)phosphinyl]benzyl 2-chloropropyl cyclohexyl phosphite, and 1-[(2-chloropropoxy)-p-tolylphosphinyl]-1-[(2-chlorodecyloxy)butoxyphosphinyl]octyl didodecyl phosphite.

Examples of products obtained when a phosphoromonochloridite is reacted with an acylphosphinate and a trivalent phosphorus ester within the indicated limits are:

2 - {$\alpha$ - [bis(6 - chloroundecyloxy)phosphinyl] - $\alpha$ - [(2-chloropropoxy)phenylphosphinyl - p - cumyloxy} - 4-methyl-1,3,2-dioxaphospholane, 1 - bis[(2 - chlorobutoxy)butylphosphinyl]ethyl bis(3-bromopropyl) phosphite, and $\alpha$ - (dinonyloxyphosphinyl) - $\alpha$ - (ethoxynaphthylphosphinyl) - 4 - methoxybenzyl 4 - chlorohexyl cyclohexyl phosphite.

Examples of products obtained when a phosphoromonochloridite is reacted with an acyl cyanide and a trivalent phosphorus ester of the above defined types are:

2 - {1 - [bis(3 - chlorodecyloxy)phosphinyl] - 1 - cyanohexyloxy}-1,3,2-dioxaphosphepane, $\alpha$-(dimethoxyphosphinyl)-$\alpha$-cyanobenzyl diethyl phosphite, and 1 - (3 - bromopropoxy)decylphosphinyl] - 1-cyanoethyl 2-chloroethyl ethyl phosphite.

Reaction of the above-described acylphosphonate, acylphosphinate, or acyl cyanide compounds with the phosphorochloridite and the triorgano phosphite ester is effected by simply mixing the three reactants at ordinary, decreased, or increased temperatures and allowing the resulting reaction mixture to stand until formation of the desired product is complete. Generally, the reaction is moderately exothermic. This is particularly true when the carbonyl compound is a lower aliphatic acylphosphonate. With such carbonyl compounds application of cooling is usually advantageous in order to obtain smooth reaction. When working with such active carbonyl compounds, optimum conditions comprise gradual addition of the acylphosphonate to the mixture of the phosphite and phosphorochloridite with stirring and application of external cooling. Usually it suffices to maintain the reaction temperature at, say, from 10° C. to 50° C. during addition of the acylphosphonate. When all of the acyl compound has been added to the phosphite-phosphorochloridite mixture and there is no longer any evidence of exothermic reaction, completion of the reaction may be assured by heating the reaction mixture to a temperature of from, say, 50° C. to 150° C. With the more sluggish carbonyl compounds, for example, dihexyl naphthoylphosphonate, ethyl (phenyl) dodecanoylphosphinate, etc., it may be necessary to heat the reaction mixture moderately, say to a temperature of about 50° C. before an exothermic reaction is initiated. Since reactivity of various carbonyl compounds is thus known to vary, it is recommended that in each initial run the carbonyl compound and the mixture of the trivalent phosphorus ester and phosphorochloridite be mixed gradually at low temperatures and that external heating be employed only when there appears to be no spontaneous increase in the temperature as a consequence of the mixing. Reaction of the triorgano phosphorus ester, phosphorochloridite, and carbonyl compound mixture takes place readily in the absence of an inert diluent or catalyst. However, catalysts and diluents or solvents may be employed. The use of diluents may be particularly advantageous when working with the more reactive carbonyl compounds; such diluents may be, for example, benzene, toluene, dioxane, methylene chloride, or hexane. When employing no diluent or using essentially stoichiometric proportions of reactants that is, 1 molar equivalent of the triorgano phosphite, 1 molar equivalent of the diorgano phosphorochloridite and 1 molar equivalent of the carbonylic compound, the reaction product obtained consists essentially of the phosphinyl-substituted phosphite product dissolved in the haloalkane which is produced as a by-product in the reaction. Such solutions may be used without further purification, for example, as gasoline additives; however, the phosphinyl-substituted phosphite product is readily separated from the by-product, when desired, by volatilizing the haloalkane to give the phosphinyl-substituted phosphite as residue. If an excess of either the phosphite or phosphorochloridite with respect to the carbonyl compound is initially present, such an excess may also be separated from the product by distillation.

Inasmuch as the by-product haloalkane is generally an article of commerce for which many applications exist, it will be appreciated that the present process for preparing the phosphinyl-substituted phosphite materials from a phosphorochloridite compound, an acylphosphonate, acylphosphinite or an acyl cyanide compound, and a triorgano phosphite or phosphonite ester is of a pronounced economic advantage in that it entails no material lost. Thus, while many currently employed processes for the manufacture of organic compounds of phosphorus entail substantial waste of halogen in that by-products of little commercial importance are often formed, in the present instance all of the halogen constituent of the raw materials is converted to products of economic importance.

The invention is further illustrated by, but not limited, by the following examples.

*Example 1*

To a mixture of 90.0 g. (0.50 mole) of diethyl acetylphosphonate and 83 g. (0.50 mole) of triethyl phosphite, cooled in an ice bath, there was added 61.5 g. (0.49 mole) of 2-chloro-1,3,2-dioxaphospholane in 0.3 hour at 3–10° C.

When the resulting exothermic reaction subsided, the mixture was warmed to 65° C. to insure complete reaction. It was then concentrated to 142° C./0.3 mm. to give 184.5 g. of 2-[1,1-bis(diethoxyphosphinyl)ethoxy]-1,3,2-dioxaphospholane, $n_D^{25}$ 1.4626, which analyzed as follows:

|  | Found | Anal. Calc'd for $C_{12}H_{27}O_9P_3$ |
|---|---|---|
| Percent C | 35.25 | 35.3 |
| Percent H | 6.67 | 6.7 |
| Percent P | 22.65 | 22.8 |

Nuclear magnetic resonance measurements showed phosphorus chemical shifts of −124.8 p.p.m. and −17.0 p.p.m. (relative to $H_3PO_4$) at about a 1:2 area ratio, respectively, for the peaks. These results are in agreement with the following structure:

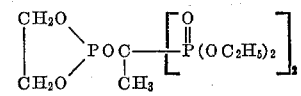

*Example 2*

To 38 g. (0.3 mole) of 2-chloro-1,3,2-dioxaphospholane and 27.6 g. (0.4 mole) of acetyl cyanide there was added 49.8 g. (0.3 mole) of triethyl phosphite in 0.2 hour at 25–30° C. while cooling when necessary. The reaction mixture was warmed to 90° C. and then concentrated at reduced pressure to insure complete reaction and remove excess reactants and by-product. Distillation of the residue gave 99.0 g. of 2-[1-(diethoxyphosphinyl)-1-cyanoethoxy]-1,3,2-dioxaphospholane,

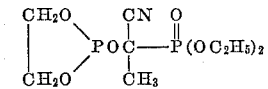

B.P. 148–155° C./0.1–0.3 mm. Redistillation gave a fraction, B.P. 139–140° C./0.05 mm., $n_D^{25}$ 1.4581, which analyzed as follows:

|  | Found | Anal. Calc'd for $C_9H_{17}NO_6P_2$ |
|---|---|---|
| Percent C | 36.27 | 36.4 |
| Percent H | 5.69 | 5.8 |
| Percent N | 4.73 | 4.7 |
| Percent P | 21.00 | 20.9 |

The nuclear magnetic phosphorus resonance spectrum had a chemical shift at −141.8 p.p.m., which represents the trivalent phosphorus, and another chemical shift of about equal intensity at −13.5 p.p.m. which represents the phosphorus of the phosphonate group. The infrared spectrum showed nitrile absorption at 1235 cm.$^{-1}$.

*Example 3*

To a reaction vessel swept with nitrogen there was added 1923 g. (14.0 moles) of phosphorus trichloride and 14.2 g. (0.18 mole) of ethylene chlorohydrin (used as catalyst). Ethylene oxide, 1532 g. (34.8 moles), was then added in 6.0 hours with cooling at 10–20° C. The resulting reaction mixture, consisting of substantially equimolar quantities of bis(2-chloroethyl) phosphorochloridite and tris(2-chloroethyl) phosphite, was swept with nitrogen for 0.3 hour.

A 495 g. portion of the above mixture was stirred and cooled as 72 g. (1.04 moles) of acetyl cyanide was added in 0.3 hour at 25–40° C. A 6.0 g. sample was removed, and the remainder was heated to reflux (115° C.) Another 6.0 g. sample was removed, and the residue was concentrated to a maximum of 164° C./0.1 mm. to obtain 449.5 g. (99% of theory) of 1-[bis(2-chloroethoxy)- phosphinyl]-1-cyanoethyl bis(2-chloroethyl) phosphite, $n_D^{25}$ 1.4941, which analyzed as follows:

|  | Found | Anal. Calc'd for $C_{11}H_{19}Cl_4NP_2$ |
|---|---|---|
| Percent C | 28.24 | 28.4 |
| Percent H | 4.28 | 4.1 |
| Percent Cl | 30.23 | 30.5 |
| Percent N | 3.30 | 3.0 |
| Percent P | 13.41 | 13.3 |

It had the structural formula:

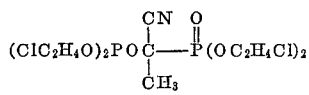

The nuclear magnetic phosphorus resonance spectrum had characteristic chemical shifts of about equal intensity at −140.8 and −13.2 p.p.m.

Example 4

To a reaction vessel containing 330.0 g. (2.4 moles) of phosphorus trichloride and 2.0 g. of ethylene chlorohydrin, there was added, below the liquid surface thereof, 282.0 g. (6.4 moles) of ethylene oxide at 15–20° C. To the resulting reaction mixture having a molar ratio of 1 mole of bis(2-chloroethyl) phosphorochloridite to 2 moles of tris(2-chloroethyl) phosphite there was added 98.5 g. (0.8 mole) of acetyl bromide in 0.3 hour with cooling at 30–40° C. This mixture was warmed to reflux (118° C.) and concentrated to a maximum pot temperature of 205° C./0.5 mm. to obtain 444.7 g. of 1,1-bis[bis(2-chloroethoxy)phosphinyl] ethyl bis(2-chloroethyl)phosphite having the structural formula,

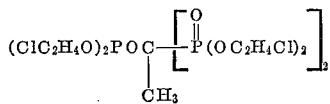

Example 5

Operating according to the procedure described in Example 4, 523 g. (3.81 moles) of phosphorus trichloride and 590 g. (10.3 moles) of propylene oxide were reacted in the presence of 2.6 g. of ethylene chlorohydrin as catalyst to prepare a mixture of bis(2-chloropropyl) phosphorochloridite and tris(2-chloropropyl) phosphite in a molar ratio of 1:2, respectively. A 5 g. sample of the product was removed, and the remainder was treated with 100 g. (1.27 moles) of acetyl chloride at 20–40° C. The resulting mixture was then heated to 85° C. for 0.3 hour, then at 85–115° C. for 0.75 hour, and finally concentrated to a maximum pot temperature of 200° C./1 mm. to obtain as residue 635.5 g. of 1,1-bis[bis(2-chloropropoxy)phosphinyl]ethyl bis(2-chloropropyl) phosphite having the structural formula,

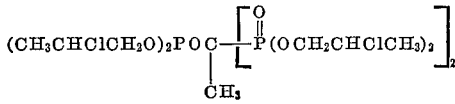

Example 6

To a mixture of 45.1 g. (0.25 mole) of diethyl acetylphosphonate and 41.5 g. (0.25 mole) of triethyl phosphite there was added 42.1 g. (0.25 mole) of 5,5-dimethyl-2-chloro-1,3,2-dioxaphosphorinane dropwise over 0.2 hour while keeping the temperature below 40° C. by cooling with an ice bath. The mixture was stirred until no further exothermic reaction was apparent and then heated to 100° C. over 0.3 hour and maintained at 95° C. to 100° C. for 0.25 hour to insure complete reaction. The mixture was concentrated to 100° C./0.2 mm. to obtain as residue 2-[1,1-bis(diethoxyphosphinyl)ethoxy]- 5,5-dimethyl-1,3,2-dioxaphosphorinane having the structure

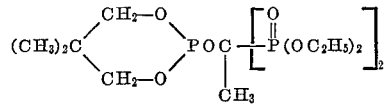

Example 7

To a mixture of 53.1 g. (0.25 mole) of ethyl (phenyl)-acetylphosphinate and 41.6 g. (0.25 mole) triethyl phosphite there was added 31.7 g. (0.25 mole) of 2-chloro-1,3,2-dioxaphospholane dropwise in 0.15 hour at 25–35° C., using ice-bath cooling. When the addition was completed, the mixture was stirred until no further reaction was apparent and then heated to 90° C. to insure complete reaction. The mixture was concentrated to 120° C./0.6 mm., leaving as residue 105.7 g. (96% of theory) of 2-[1-(diethoxyphosphinyl)-1-(ethoxyphenylphosphinyl)-ethoxy]-1,3,2-dioxaphospholane having the structure

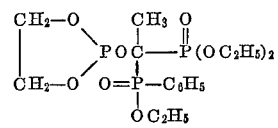

Example 8

The product of Example 7 was also prepared according to the following procedure.

To a mixture of 45.1 g. (0.25 mole) of diethyl acetylphosphonate and 49.6 g. (0.25 mole) diethyl phenylphosphonite there was added 31.7 g. (0.25 mole) of 2-chloro-1,3,2-dioxaphospholane dropwise in 0.15 hour at 25–35° C., using ice-bath cooling. When the addition was completed, the mixture was stirred until no further reaction was apparent and then heated to 90° C. to insure complete reaction. The mixture was then concentrated to 130° C./0.3 mm. to leave as residue 102.1 g. of 2-[1-(diethoxyphosphinyl) - 1 - (ethoxyphenylphosphinyl)ethoxy]-1,3,2-dioxaphospholane having the structure

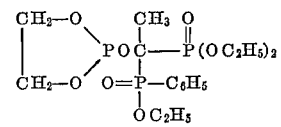

Example 9

To a mixture of 41.9 g. (0.24 mole) of 4,5-benzo-2-chloro-1,3,2-dioxaphospholane and 39.9 g. (0.24 mole) of triethyl phosphite there was added 51.0 g. (0.24 mole) of ethyl (phenyl)-acetylphosphinate dropwise in 0.15 hour at 20–30° C., using ice-bath cooling. When the addition was completed, the mixture was stirred and heated gradually to 86° C. to insure complete reaction. It was then concentrated to 100° C./0.55 mm., leaving as residue 114.3 g. (98% of theory) of 2-[1-(diethoxyphosphinyl) - 1 - (ethoxyphenylphosphinyl)ethoxy] - 4,5-benzo-1,3,2-dioxaphospholane, having the structure

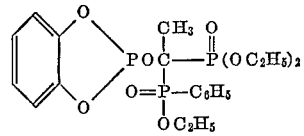

Example 10

To a mixture consisting of 16.6 g. (0.10 mole) of triethyl phosphite and 16.7 g. (0.093 mole) of diethyl acetylphosphonate there was added, during 0.1 hour, 14.5 g. (0.093 mole) of diethyl phosphorochloridite while maintaining the temperature of the reaction mixture at 25–35° C. by ice-cooling. Removal of the by-product ethyl chloride was effected by warming the reaction mixture to 75° C. under water-pump vacuum. Distillation to remove material boiling below a pot temperature of 154° C./2 mm., gave as residue 34.7 g. of the substantially pure 1,1- bis-(diethoxyphosphinyl)ethyl diethyl phosphite, $n_D^{25}$ 1.4502, having the following structure

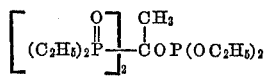

Analysis of the presently provided diphosphonate-phosphite gave the following results:

|  | Found | Anal. Calc'd for $C_{14}H_{33}O_9P_3$ |
|---|---|---|
| Percent C | 38.39 | 38.4 |
| Percent H | 7.74 | 7.6 |
| Percent P | 21.18 | 21.2 |

*Example 11*

To a mixture consisting of 62.1 g. of diethyl propionylphosphonate and 53.2 g. of triethyl phosphite there was added dropwise, 55.9 g. of 2-chloro-4,5-benzo-1,3,2-dioxaphospholane. During the addition the temperature was kept at 25–35° C. by cooling. The whole was then stirred, with occasional cooling, until cessation in temperature rise. The reaction was completed by heating the mixture to 75° C. Concentration to 160° C./0.15 mm., gave as residue 129.5 g. of the substantially pure 2-[1,1-bis(diethoxyphosphinyl)propoxy] - 4,5 - benzo - 1,3,2-dioxaphospholane, $n_D^{25}$ 1.4999, analyzing 43.83% carbon and 6.52% hydrogen as against 43.45% and 6.21%, the calculated values, and having the structure

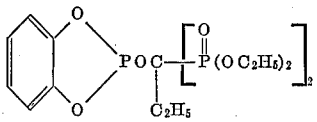

*Example 12*

To a mixture consisting of 60.6 g. (0.25 mole) of diethyl benzoylphosphonate and 41.5 g. (0.25 mole) of triethyl phosphite cooled to 10° C., there was added dropwise, 31.6 g. (0.25 mole) of 2-chloro-1,3,2-dioxaphospholane at 10–20° C. The reaction was completed by heating the mixture to 85° C.; and by-product ethyl chloride and any unreacted material were removed by placing the mixture under water-pump vacuum and heating it to 90° C. Distillation in vacuo gave 67.4 g. of the substantially pure 2-[α,α-bis(diethoxyphosphinyl)benzyloxy]-1,3,2-dioxaphospholane, B.P. 161–167° C./0.2 mm., $n_D^{25}$ 1.5006, analyzing 43.84% carbon and 6.70% hydrogen as against 43.45% and 6.21%, the calculated values, and having the structure

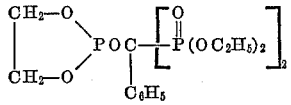

The phosphinylhydrocarbyl phosphites of this invention are stable, usually high-boiling materials which range from viscid liquids to waxy or crystalline solids. They are useful as plasticizers, functional fluids, gear and lubricant oil additives and dielectrics. They are useful as biological toxicants in quantities ranging from 1 to 10 p.p.m. up to 10,000 p.p.m., depending upon the nature of the organism. They are useful as lead scavengers in leaded gasolines in quantities of from 0.05 to 10.0 moles per mole of lead in the gasoline. They are useful as fire retardant and flame-proofing additives for many polymeric materials, such as urea-formaldehyde, phenol-formaldehyde, and epoxy resins; in polyester type compositions such as polyterephthalates, polyacrylonitriles, and polyamide polymers which are used to make fibers; in polyurethane and polystyrene-containing foams; in rubber based emulsion type coatings; as well as in cellulosic and carbonaceous combustible materials in quantities ranging from 0.5 to 25% by weight, depending upon the materials to which they are added.

We claim:
1. Compounds of the formula

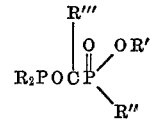

wherein R is selected from the group consisting of alkyloxy and haloalkyloxy radicals having from 1 to 12 carbon atoms, and wherein two R radicals taken together denote an -O-hydrocarbylene-O- radical which completes a ring having from 2 to 4 carbon atoms with the phosphorus atom and has a total of from 2 to 12 carbon atoms, R' is selected from the group consisting of alkyl and haloalkyl radicals having from 1 to 12 carbon atoms, R" is selected from the group consisting of OR' and hydrocarbyl radicals which are free from aliphatic unsaturation and have from 1 to 12 carbon atoms, R''' is selected from the group consisting of alkyl radicals having from 1 to 12 carbon atoms and aryl radicals having from 6 to 12 carbon atoms, and Y is selected from the group consisting of the -cyano group (—CN) and the radical

wherein R' and R" are as defined above.

2. Compounds of the formula

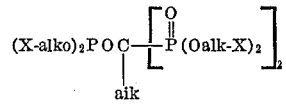

wherein X-alk is a halogen-substituted alkyl radical having from 1 to 12 carbon atoms, and alk is an alkyl radical having from 1 to 12 carbon atoms.

3. Compounds of the formula

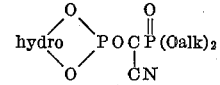

wherein hydro is a bivalent hydrocarbylene radical having from 2 to 12 carbon atoms which completes a ring having from 2 to 4 carbon atoms with the phosphorus atom.

4. Compounds of the formula

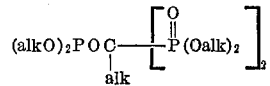

wherein each alk denotes an alkyl radical having from 1 to 12 carbon atoms.

5. A compound having the formula

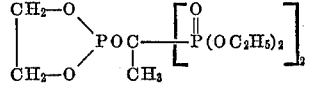

6. A compound having the formula

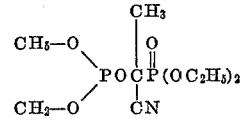

7. A compound having the formula

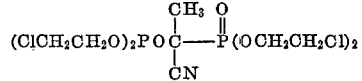

8. A compound having the formula

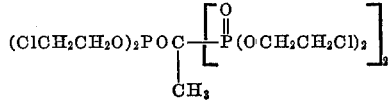

9. A compound having the formula

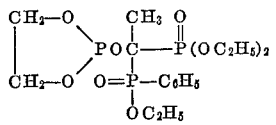

10. A compound having the formula

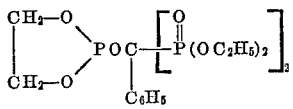

11. A method which comprises reacting a trivalent phosphorus chloride compound of the formula $$R_2P\text{—}Cl$$

wherein each R is selected from the group consisting of alkyloxy and haloalkyloxy radicals having from 1 to 12 carbon atoms, and wherein two R radicals taken together denote an -O-hydrocarbylene-O- radical which completes a ring having from 2 to 4 carbon atoms with the phosphorus atom and having a total of from 2 to 12 carbon atoms, with a trivalent phosphorus ester of the formula $$R''P(OR')_2$$

wherein R' is selected from the group consisting of alkyl and haloalkyl radicals having from 1 to 12 carbon atoms, R'' is selected from the group consisting of OR' and hydrocarbyl radicals which are free from aliphatic unsaturation and having from 1 to 12 carbon atoms, and a compound of the formula

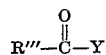

wherein R''' is selected from the group consisting of alkyl radicals having from 1 to 12 carbon atoms and aryl radicals having from 6 to 12 carbon atoms, and Y is selected from the group consisting of the -cyano group (—CN) and a radical having the formula

where R' and R'' are as defined above.

12. A method which comprises reacting a mixture of a bis(haloalkyl) phosphorochloridite and a tris(haloalkyl) phosphite wherein each haloalkyl radical is a halogen-substituted alkyl radical having from 1 to 12 carbon atoms with a compound of the formula

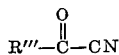

wherein R''' is selected from the group consisting of alkyl radicals having from 1 to 12 carbon atoms and aryl radicals having from 6 to 12 carbon atoms and recovering from the resulting reaction mixture a compound of the formula

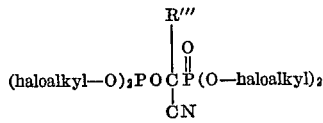

wherein R''', Y and haloalkyl are as defined above.

13. A method which comprises reacting a mixture of a bis(haloalkyl) phosphorochloridite and a tris(haloalkyl) phosphite wherein each haloalkyl radical is a halogen-substituted alkyl radical having from 1 to 12 carbon atoms, with a compound of the formula

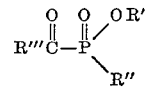

wherein R''' is selected from the group consisting of alkyl radicals having from 1 to 12 carbon atoms, and aryl radicals having from 6 to 12 carbon atoms, R' is selected from the group consisting of alkyl and halogen-substituted alkyl radicals having from 1 to 12 carbon atoms, and R'' is selected from the group consisting of OR' and hydrocarbyl radicals which are free from aliphatic unsaturation and have from 1 to 12 carbon atoms, and recovering from the resulting reaction mixture a compound of the formula

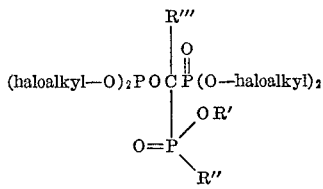

wherein R', R'', R''' and haloalkyl are as defined above.

14. A method which comprises reacting 2-chloro-1,3,2-dioxaphospholane with diethyl acetylphosphonate and triethyl phosphite, and recovering from the resulting reaction mixture 2-[1,1-bis(diethoxyphosphinyl)ethoxy]-1,3,2-dioxaphospholane.

15. A method which comprises reacting bis(2-chloroethyl)acetylphosphonate with bis(2-chloroethyl) phosphorochloridite and tris(2-chloroethyl) phosphite, and recovering from the resulting reaction mixture 1,1-bis[bis-(2 - chloroethoxy)phosphinyl]ethyl bis(2 - chloroethyl)-phosphite.

16. A method according to the method of claim 15 wherein the bis(2-chloroethyl) acetylphosphonate is prepared in situ by reacting acetyl bromide with a mixture of bis(2-chloroethyl) phosphorochloridite and tris(2-chloroethyl) phosphite.

17. A method which comprises reacting acetyl cyanide with bis(2-chloroethyl) phosphorochloridite and tris(2-chloroethyl) phosphite, and recovering from the resulting reaction mixture 1-[bis(2-chloroethoxy)phosphinyl]-1-cyanoethyl bis(2-chloroethyl) phosphite.

18. A method which comprises reacting 2-chloro-1,3,2-dioxaphospholane with ethyl (phenyl)acetylphosphinate and triethyl phosphite and recovering 2-[1-(diethoxyphosphinyl) - 1 - (ethoxyphenylphosphinyl)ethoxy] - 1,3,2-dioxaphospholane.

19. A method which comprises reacting 2-chloro-1,3,2-dioxaphospholane with diethyl benzoylphosphonate and triethyl phosphite, and recovering from the resulting reaction mixture 2-[1,1-bis(diethoxyphosphinyl)benzyloxy]-1,3,2-dioxaphospholane.

No references cited.

UNITED STATES PATENT OFFICE
CERTIFICATE OF CORRECTION

Patent No. 3,029,271    April 10, 1962

Gail H. Birum et al.

It is hereby certified that error appears in the above numbered patent requiring correction and that the said Letters Patent should read as corrected below.

Column 1, line 41, for "wherein R, R', R", R"', and Y are as defined above. For" read -- wherein R' and R" are as defined above. --; lines 61 to 65, the formula should appear as shown below instead of as in the patent:

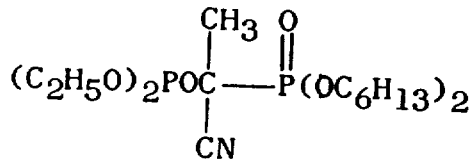

column 2, line 13, after "are" insert -- as --; column 10, lines 3 to 7, the formula should appear as shown below instead of as in the patent:

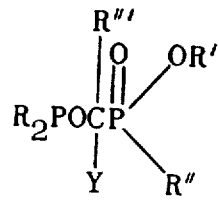

same column 10, lines 30 to 33, the formula should appear as shown below instead of as in the patent:

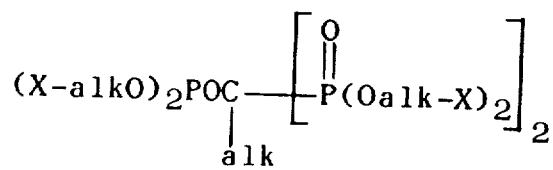

same column 10, lines 60 to 64, the formula should appear as shown below instead of as in the patent:

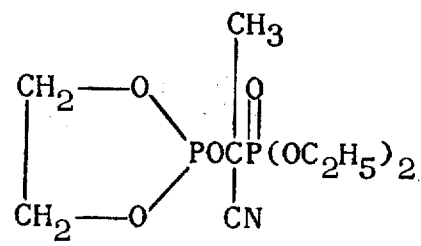

Signed and sealed this 15th day of January 1963.

(SEAL)
Attest: